United States Patent Office 3,126,345
Patented Mar. 24, 1964

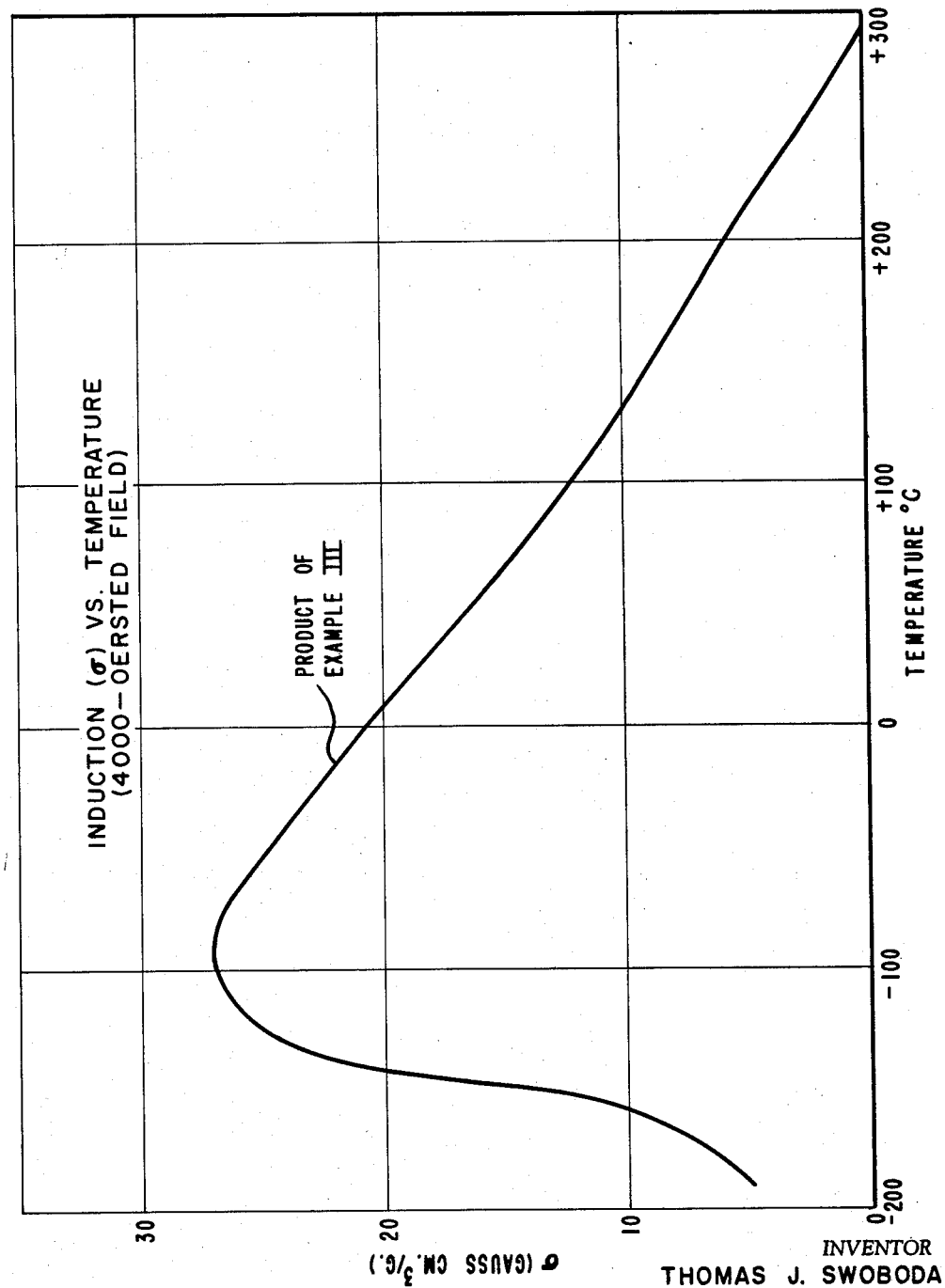

3,126,345
FERROMAGNETIC COMPOSITIONS AND THEIR
PREPARATION
Thomas J. Swoboda, Wilmington, Del., assignor to E. I.
du Pont de Nemours and Company, Wilmington, Del.,
a corporation of Delaware
Filed Oct. 31, 1960, Ser. No. 66,194
17 Claims. (Cl. 252—62.5)

This invention relates to ferromagnetic materials and to methods for their preparation. More particularly, this invention relates to ferromagnetic compositions exhibiting a maximum saturation induction within a restricted temperature range and a very much smaller induction at temperatures both above and below this range, and to methods for the preparation of such compositions.

Conventional magnetic materials are characterized by a saturation induction that decreases monotonically as temperature increases. Above a temperature termed the Curie temperature, or Curie point, the behavior of such materials becomes that of a paramagnetic substance, but at lower temperatures, even as low as the boiling point of liquid helium and below, ferromagnetic behavior is retained and saturation induction increases continuously as temperature decreases.

A few materials have been reported such as the sulfides of chromium and iron, for which saturation induction increases with increasing temperature in a temperature range below the Curie point. The effect has not been well characterized in these materials, however, because of an extremely critical dependence on metal-sulfur ratio and, especially for the iron sulfide, on prior thermal history. Recently there has been developed a class of ferromagnetic compositions which exhibit a maximum saturation induction between 0° K. and the Curie point of the composition. These compositions contain at least two transition elements selected from groups V–B, VI–B, and VII–B of the periodic table, of which at least one is taken from the first row of said transition elements, and at least one element of group V–A. Such compositions are more fully described and claimed in my copending application, Serial No. 19,370, filed April 1, 1960, and now abandoned, and its continuation-in-part, Serial No. 181,744, filed March 22, 1962. These compositions possess characteristics which render them useful in a variety of devices for the interconversion of various forms of energy and in other applications.

It is an object of this invention to provide new ferromagnetic compositions based on readily available components which exhibit a maximum saturation induction within a useful temperature range. A further object is to provide a process for preparing such ferromagnetic compositions. Other objects will appear hereinafter.

These objects are obtained by providing a ferromagnetic composition of the formula $M_xMn_{3-x}Q_yZ_a$, where M is selected from metals of atomic number 26–30, Q is one or more elements of group V–A of atomic number greater than 15 (i.e., As, Sb, and Bi), Z is selected from elements from groups III, IV (both A and B subgroups), $x$ is 0.03–1.0, $y$ is 1.0–2.0, and $a$ is 0–1.0.

As indicated by the above formula, manganese is an essential component of the compositions of this invention and is present to the extent of at least 40 atom percent (based on the total of M, Mn and Q). Component M is a metal of atomic number 26–30, i.e., component M is iron, cobalt, nickel, copper or zinc. Of these, cobalt, copper and zinc have given especially useful compositions and it is preferred that component M be one of these metals. This component is present to an extent of 0.6–25 atom percent and component M and manganese together make up 60–75 atom percent of the total of M, Mn and Q.

The periodic table referred to herein is the table appearing in Deming's "General Chemistry," John Wiley & Sons, Inc., 5th ed., chapter 11.

The element of group V–A of atomic number greater than 15, component Q, can be arsenic, antimony or bismuth, and is present in an amount of 25–40 atom percent. It is preferred that the element Q be antimony or arsenic since compositions having very desirable magnetic properties are obtained when antimony or arsenic is present. Compositions containing two group V–A elements such as, for example, arsenic and antimony, bismuth and antimony, or arsenic and bismuth, are also useful.

The component Z, which may be present in the novel compositions of this invention, is one or more elements of group III or IV in an amount of 0–25 atom percent. Although any of the elements in these groups can be employed, the elements indium, lead, and scandium yield compositions having maximum saturation induction in a range useful for many practical applications and are preferred. Elements of low atomic number, i.e., boron, carbon, if present, should not exceed about 5 atom percent.

It will be apparent from the foregoing that the compositions of this invention can be considered to be derived from a compound of manganese with a group V–A element, e.g., $Mn_2Sb$, by replacement of part of the manganese by a metal of atomic number 26–30 and, optionally, introduction of an element of group III or IV, or a second element of group V–A in addition to or as partial replacement for the group V–A element. Some deviation from the exact stoichiometry of the prototype may accompany such modifications in the compound of manganese with the group V–A element.

Specific compositions, according to the present invention, are manganese copper antimonide, manganese cobalt antimonide, manganese iron arsenide-antimonide, manganese nickel antimonide, manganese cobalt arsenide, manganese zinc arsenide-antimonide, manganese cobalt germanide-antimonide, and manganese copper indium antimonide.

The novel compositions of this invention exhibit a tetragonal crystal structure, and many have a maximum saturation induction at a temperature in the range of −150° to +150° C., with a Curie temperature above 150° C. Such compositions are useful in devices operating at temperatures near room temperature. Compositions having a maximum saturation induction at very low temperatures can also be prepared and are especially useful at temperatures near the boiling point of liquid helium and below. The manner in which saturation induction varies with temperature can be controlled by modifying the composition of the ferromagnetic product. The best compositions exhibit a very low residual magnetism below the lower ferromagnetic transition temperature.

For a better understanding of the unusual magnetic-temperature behavior of my compositions, reference should be made to the accompanying drawing which is a typical plot showing the relationship between saturation induction and temperature for a representative ferromagnetic composition of the invention. A more detailed description of this induction-temperature curve may be found later in the specification under Example III.

These novel ferromagnetic compositions are prepared by heating mixtures of the elements to a temperature in the range of 600°–1400° C. In practice, temperatures of 700–1200° C. are usually employed. Temperatures of at least 850° C. are generally necessary if the composition is to be melted.

The time of heating is not critical but should be sufficient to permit complete reaction of the ingredients. In the examples below, heating times ranging up to about 50 hours are employed. However, longer times may be useful in some cases such as in the preparation of the compositions in single crystal form.

Heating may be carried out at atmospheric pressure with the reactants protected by a blanket of inert gas such as helium or argon. Alternatively, the reaction may be conducted in an evacuated vessel. It is also possible to employ superatmospheric pressures. Small batches of product may be readily prepared by placing the ingredients in a quartz tube which is then evacuated and sealed. In this case, the reaction is carried out under the autogenous pressure developed by the reaction mixture at the reaction temperature.

The materials employed in preparing ferromagnetic compositions of this invention can be the elements themselves or any of the binary or ternary combinations thereof, such as manganese antimonide, copper antimonide, iron arsenide, indium-manganese alloy, etc. It is preferred that the materials be in powder or granular form and that they be well mixed before heating is commenced.

The starting materials are employed in such relative amounts that the resulting mixture contains the desired proportions of manganese and the components M, Q and Z as defined above. These proportions are preferably chosen to fall within the ranges stated above since products prepared from such mixtures require a minimum of purification. It is possible, however, to prepare the products of this invention from certain mixtures falling outside the composition ranges stated. Of course such products will be contaminated with by-products and it is desirable to avoid extensive departure from the stated ranges. Thus, while starting compositions containing as little as 16 atom percent of component Q and up to 25 atom percent or more of component Z can be employed and produce crude products exhibiting the novel magnetic behavior described herein, such products require purification if optimum properties are to be realized. It is better if the starting mixture contains not less than 25 atom percent of component Q and not more than 25 atom percent of component Z.

After the desired heating cycle has been completed, the reaction mixture is cooled and, if desired, subjected to purification, e.g., by extraction with acids or, after grinding, by magnetic separation. The cooling may be rapid or the product may be annealed by slow cooling.

The novel ferromagnetic compositions of this invention exhibit several magnetic characteristics which make them especially valuable for use in various specific applications. The novel lower ferromagnetic transition temperature is a distinguishing feature conferring unusual utility on these materials. This temperature is determined in the same manner used for the determination of ordinary Curie temperatures, i.e., by the measurement of magnetic response as a function of temperature. It will, of course, be necessary in some instances to modify the usual equipment to the extent of providing means for cooling the sample in addition to the usual heating means. A rapid method for determining qualitatively whether a product, which is magnetic at room temperature, possesses a low temperature magnetic transition point is to observe its magnetic behavior upon cooling to a low temperature such as that of liquid nitrogen.

Another critical magnetic property which is important to the technical utility of these materials is the induction per gram or sigma value, $\sigma_s$. The sigma value, $\sigma_s$, is defined on pp. 7 and 8 of Bozorth's "Ferromagnetism," Van Nostrand Co., New York, 1951. This sigma value is equal to the intensity of magnetization, $I_s$, divided by the density, $d$, of the material. The sigma values given herein are determined in a field of 4000 oersteds on apparatus similar to that described by T. R. Bardell on pp. 226–228 of "Magnetic Materials in the Electric Industry," Philosophical Library, New York, 1955.

The compositions of this invention are illustrated further by the examples below in which the proportions of ingredients are expressed in part by weight unless otherwise noted.

EXAMPLE I

A pelleted blend, consisting of 2.15 g. of manganese, 0.06 g. of copper, and 2.38 g. of antimony was placed in a quartz tube which was then evacuated and sealed. This blend contained Mn, Cu, and Sb in the atomic proportions: 65.5/1.7/32.8. The tube and contents were heated to 980° C. over a period of 8 hours, held at this temperature for 15 hours, and then slowly cooled to room temperature during 10 hours. The product was a silvery, metallic slug which was magnetic at room temperature. A portion of the slug was pulverized and the saturation induction of the powder determined as a function of temperature. Maximum saturation induction occurred at −120° C. and the Curie point was approximately 310° C.

EXAMPLE II

A pelleted blend of 2.09 g. of manganese, 0.13 g. of copper, and 2.25 g. of antimony (i.e., Mn, 65.0 atom percent; Cu, 3.4 atom percent; Sb, 31.6 atom percent) was charged into a quartz tube which was so arranged that it could be evacuated or filled with argon. The tube and contents were heated to 350° C. under vacuum and this temperature was maintained for 1.25 hours. Argon was then continually passed over the sample while it was heated to 975° C. during 2.5 hours. A temperature of 975° C. was maintained for 17 hours and the sample was then slowly cooled to room temperature during 10 hours. An atmosphere of argon was also maintained over the sample during the latter heating and cooling periods. The relationship of saturation induction to temperature for this sample was determined. Maximum induction occurred at −77° C. and the lower ferromagnetic transition temperature was −140° C. The sample exhibited a Curie point of 260° C. The X-ray diffraction pattern of this material showed it to possess a tetragonal crystal structure of $Cu_2Sb$-type with cell constants of $a_0$, 4.08 A.; $c_0$, 6.56 A.

EXAMPLE III

A pelleted blend of 4.06 g. of manganese, 0.38 g. of copper, 0.23 g. of indium, and 4.62 g. of antimony (i.e., Mn, 61.66 atom percent; Cu, 5.00 atom percent; In, 1.67 atom percent; Sb, 31.67 atom percent) was placed in a quartz tube as described in Example I which was evacuated, heated to a temperature of 332° C. during 5 hours, and finally sealed under vacuum. The sealed tube and contents were placed for 3 hours in the hottest zone (940°–957° C.) of a furnace having a preestablished thermal gradient of 40° C./in. near the melting point of the sample (approximately 900° C.). The tube and contents were next lowered through the thermal gradient at a rate of 0.67″/hr. and reached room temperature in about a 24-hour period. The reaction product was a silvery, polycrystalline, metallic material which was magnetic at room temperature and exhibited an X-ray diffraction pattern as summarized in Table I. The relationship between induction and temperature was determined on a powdered sample of this product as illustrated in the accompanying drawing. The lower ferromagnetic transition occurred at −160° C., maximum saturation induction at −90° C., and the Curie point at 290° C.

Table I
X-RAY PATTERN OF COPPER-MANGANESE-INDIUM-ANTIMONIDE

| Interplanar Spacings [1] | Relative Intensities [2] |
|---|---|
| 6.458 | $M_4$ |
| 3.450 | $M_2$ |
| 3.252 | $M_3$ |
| 2.855 | $M_1$ |
| 2.627 | $M_1$ |
| 2.540 | V |
| 2.149 | S |
| 2.030 | S |
| 1.913 | $M_3$ |
| 1.748 | $M_3$ |
| 1.723 | $M_3$ |
| 1.627 | $M_3$ |
| 1.509 | V |
| 1.483 | $M_3$ |
| 1.434 | $M_3$ |
| 1.390 | $M_4$ |
| 1.314 | $M_4$ |
| 1.284 | $M_4$ |
| 1.271 | $M_4$ |
| 1.261 | F |
| 1.196 | $M_1$ |

[1] Angstrom units.
[2] S indicates the strongest lines in the pattern; $M_1$, $M_2$, $M_3$ and $M_4$ indicate lines of medium intensity decreasing in the order $M_1$ to $M_4$; F indicates weak lines and V very weak lines.

EXAMPLE IV

A mixture containing 0.74 g. of manganese, 0.17 g. of cobalt, 0.99 g. of indium, and 1.05 g. of antimony (i.e., Mn, 41.7 atom percent; Co, 8.3 atom percent; In, 25 atom percent; Sb, 25 atom percent), was heated for 24 hours in a sealed evacuated quartz tube at a temperature of 900–920° C. and then quickly cooled to room temperature. The product was a crystalline, gray composition exhibiting a maximum saturation induction in the range of 10–20° C. and a Curie point in the range of 200–250° C. A purified magnetic phase was prepared by extracting the product for 20 minutes with mixture of 0.38 g. picric acid, 23 ml. conc. HCl and 75 ml. absolute alcohol, then extracting 5 minutes with dilute $H_2SO_4$, and finally separating magnetically. The X-ray diffraction pattern of the purified product (Table II) indicated that the crystal structure was of the $Cu_2Sb$-type with cell constants $a_0=4.075$, $c_0=6.32$.

Table II
X-RAY PATTERN OF COBALT-MANGANESE-INDIUM-ANTIMONIDE

| Interplanar Spacings [1] | Relative Intensities [2] |
|---|---|
| 3.413 | $M_2$ |
| 3.159 | $M_3$ |
| 2.877 | $M_2$ |
| 2.616 | $M_2$ |
| 2.128 | S |
| 2.034 | S |
| 1.943 | V |
| 1.753 | $M_3$ |
| 1.706 | $M_3$ |
| 1.467 | $M_3$ |
| 1.441 | $M_2$ |
| 1.382 | V |
| 1.331 | V |
| 1.313 | $M_3$ |
| 1.291 | $M_3$ |
| 1.265 | F |
| 1.195 | $M_1$ |

[1] Angstrom units.
[2] S indicates the strongest lines in the pattern; $M_1$, $M_2$, $M_3$ and $M_4$ indicate lines of medium intensity decreasing in the order $M_1$ to $M_4$; F indicates weak lines and V very weak lines.

A second portion of this product was treated with acids, as described above, magnetically separated and dried. Analysis of this purified product showed the presence of cobalt, manganese, antimony and indium in the atomic proportions 8.8:45.1:29.4:16.7, respectively, corresponding to the formula $$Co_{0.49}Mn_{2.51}Sb_{1.64}In_{0.93}$$

EXAMPLE V

Manganese, zinc, antimony and indium in particulate form were blended in the atomic proportions 16:4:9:1. The blend was placed in a quartz tube which was evacuated and sealed. The tube and contents were heated at 780° C. for 40 hours, then slowly cooled. The product, after removal from the quartz tube, was a porous, pale gray, beautifully crystalline solid. Qualitatively, the magnetic response of this product decreased on cooling to liquid nitrogen temperature from room temperature. Determination of the relationship of saturation induction to temperature showed the Curie temperature to be 240° C., and maximum saturation induction to occur at −120° C. At −180° C., the induction was still decreasing and had attained a value approximately one-half that at −120° C.

The novel products of this invention are useful at temperatures within the ferromagnetic range, in any of the conventional applications for ferromagnetic materials for which their properties render them suitable, e.g., electromagnets, high frequency coil cores, information and memory storage elements, and the like.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A ferromagnetic composition exhibiting a tetragonal crystal structure of the $Cu_2Sb$-type having the formula $$M_xMn_{3-x}Q_yZ_a$$

wherein M is a metal selected from the class consisting of iron, cobalt, nickel, copper and zinc, Q represents at least one element selected from the class consisting of arsenic, antimony, and bismuth, Z is an element of the class consisting of the elements of groups III–IV of the periodic table, $x$ is 0.03–1.0, $y$ is 1.0–2.0, and $a$ is 0–1.0.

2. The composition of claim 1 wherein M is present in an amount of 0.6 to 25 atom percent and component M and manganese taken together make up 60 to 75 atom percent of the total of M, Mn and Q.

3. The composition of claim 1 wherein said composition is further characterized by having a maximum saturation induction at a temperature below the Curie point of the composition.

4. A ferromagnetic composition exhibiting a tetragonal crystal structure and having the formula $$M_xMn_{3-x}Q_yZ_a$$

wherein M is a metal selected from the class consisting of iron, cobalt, nickel, copper, and zinc, Q represents at least one element selected from the class consisting of arsenic, antimony, and bismuth, Z is an element of the class consisting of the elements of groups III–IV of the periodic table, $x$ is 0.03–1.0, $y$ is 1.0–2.0, and $a$ is 0–1.0.

5. A ferromagnetic composition exhibiting a tetragonal crystal structure of the $Cu_2Sb$-type and consisting essentially of 0.6 to 25 atom percent of a metal of atomic number 26–30, at least 40 percent of manganese, 25 to 40 atom percent of an element selected from the class consisting of arsenic, antimony, and bismuth, and from 0 to 25 atom percent of a member of the class consisting of the elements of groups III–IV of the periodic table.

6. The ferromagnetic composition of claim 1 in which Q is antimony.

7. A ferromagnetic composition exhibiting a tetragonal crystal structure of the $Cu_2Sb$-type and consisting essentially of 0.6 to 25 atom percent of a metal of atomic number 26–30, at least 40 atom percent of manganese, 25 to 40 atom percent of antimony, and 0 to 25 atom percent of indium.

8. Process for preparing ferromagnetic compositions which comprises heating together at a temperature of from 600 to 1400° C. a metal selected from the class consisting of iron, cobalt, nickel, copper and zinc, manganese, at least one element selected from the class consisting of arsenic, antimony, and bismuth, and up to 25 atom percent of a member selected from the class consisting of the elements from groups III–IV of the periodic table.

9. The composition of claim 1 in which M is cobalt.
10. The composition of claim 1 in which M is nickel.
11. The composition of claim 1 in which M is copper.
12. The composition of claim 1 in which M is zinc.
13. The composition of claim 6 in which M is cobalt.
14. The composition of claim 6 in which M is nickel.
15. The composition of claim 6 in which M is copper.
16. The composition of claim 6 in which M is zinc.
17. The composition of claim 1 wherein said composition is further characterized by having a maximum saturation induction at a temperature in the range of −150° C. to +150° C.

References Cited in the file of this patent

FOREIGN PATENTS 159,988    Switzerland _____ Apr. 17, 1933

OTHER REFERENCES

Foex: Bull. Soc. Chem. France, 1949, Meses au point D157–D160.